June 26, 1956  C. C. KLICK  2,752,505
HIGH ENERGY RADIATION DOSIMETER
Filed Feb. 6, 1953  2 Sheets-Sheet 1
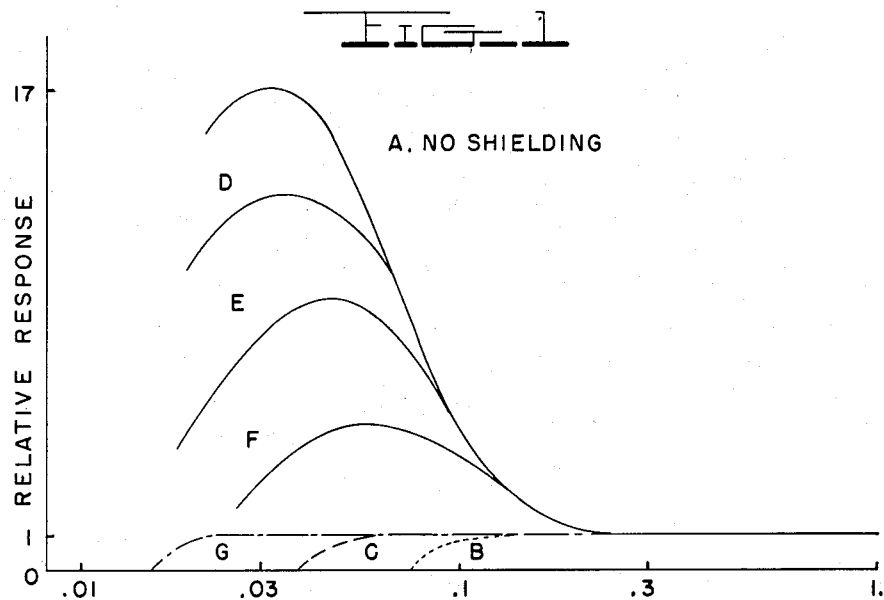
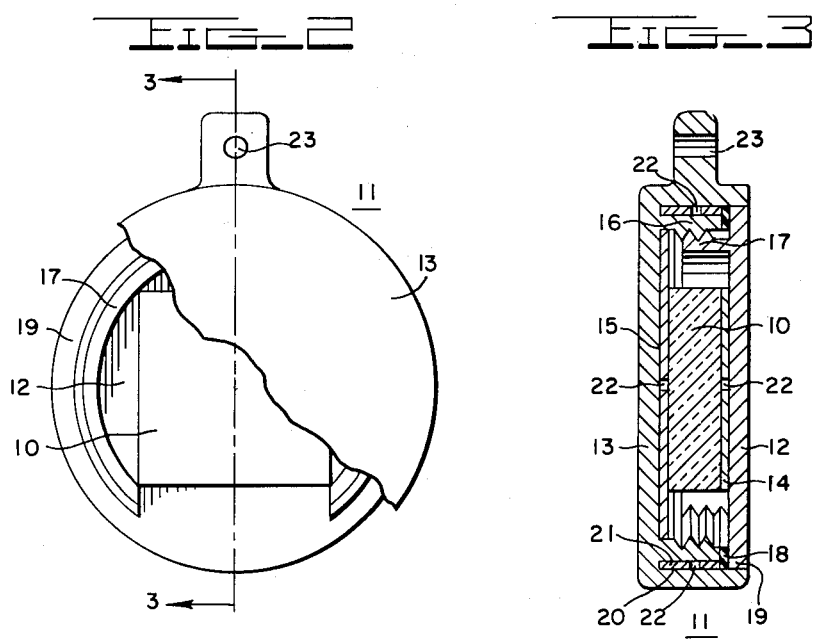
INVENTOR
CLIFFORD C. KLICK
BY
*Howard White*  ATTORNEYS

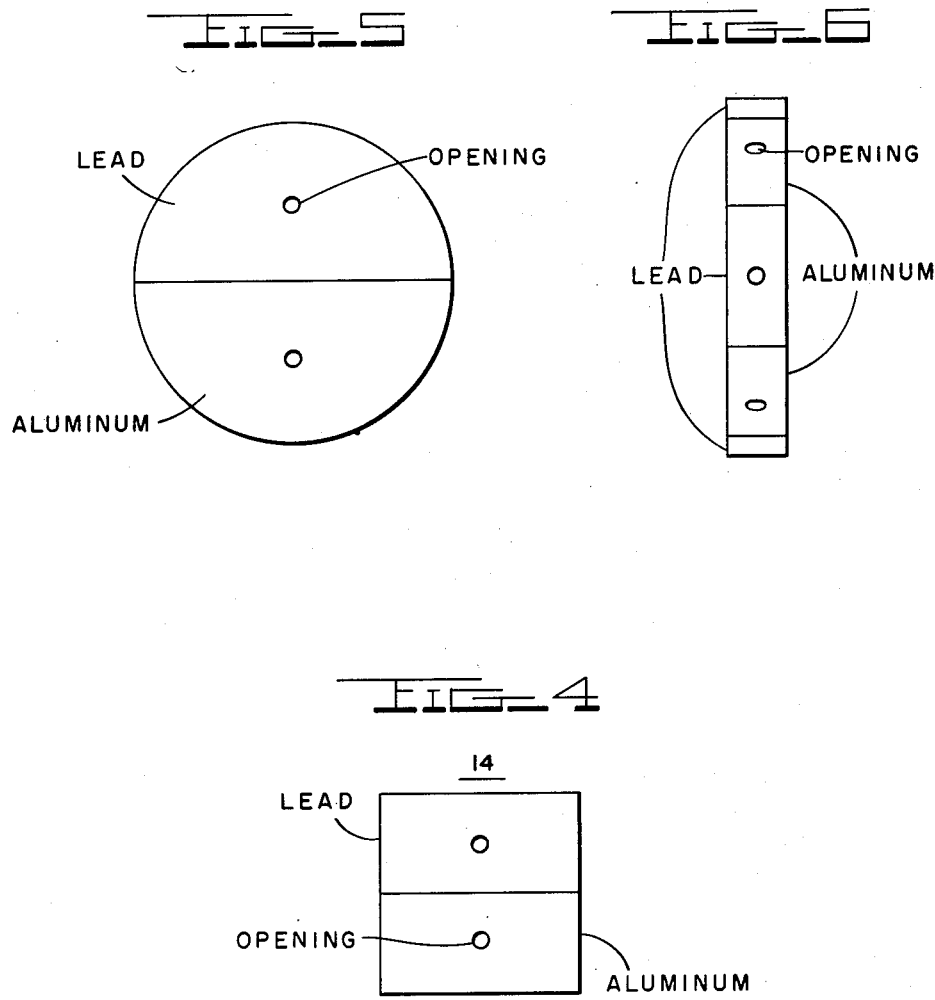

United States Patent Office 2,752,505
Patented June 26, 1956

2,752,505

HIGH ENERGY RADIATION DOSIMETER

Clifford C. Klick, Washington, D. C., assignor to the United States of America as represented by the Secretary of the Navy Application February 6, 1953, Serial No. 335,612

7 Claims. (Cl. 250—83)

(Granted under Title 35, U. S. Code (1952), sec. 266)

The present invention relates in general to dosimeters for measurement of high energy radiation such as X-rays, gamma rays or radiation from radioactive or fissionable material more particularly the invention relates to a dosimeter of the portable type to be worn by personnel likely to be exposed to high energy radiation.

An object of the invention is the provision of a portable dosimeter adapted to be worn by personnel and capable of accumulative response to varying dosages of radiation to which the wearer may be subjected from any direction.

Another object is the provision of a dosimeter with improved uniformity of response to a relatively wide range of high energy radiation ranging from the low X-ray energies or so called soft rays to the higher energy radiations such as gamma rays or so called hard rays.

A further object is the provision in a dosimeter, of shielding means capable of absorbing soft and hard rays in a manner to effect relatively greater shielding against those softer rays to which certain types of detecting materials, for example silver activated phosphate glass, are more sensitive than to the harder rays.

Various other objects and advantages of the invention will become apparent from a perusal of the following specification and the drawings accompanying the same.

In the drawings:

Fig. 1 is a characteristic curve of a specimen of silver activated phosphate glass showing intensity of fluorescent luminescence versus effective energy in megavolts, with energy plotted logarithmically.

Fig. 2 is a front plan view of a preferred embodiment of the invention with the cover element and gasket partly broken away.

Fig. 3 is a vertical section taken on the line 3—3 of Fig. 2, with the cover element in place.

Fig. 4 is a face view of a modification of rear shield element 14 constructed of two different materials.

Fig. 5 is a face view of a modification of the front shield element 15 constructed of two different kinds of material.

Fig. 6 is a side view of a modification of the circumferential shield element 21 composed of two different materials.

The invention is directed to means for effectively utilizing, for dosage measurement of high energy radiation, a dosage detecting substance capable of affording an indication of the average or integrated value of different degrees of change proportional to dosage recorded in different portions, but normally unsatisfactory because of an unduly high sensitivity to irradiation in the region of low X-ray energies as compared with that of higher X-ray energies or gamma rays.

Such a detecting substance is exemplified in the radiophotoluminescent material silver activated phosphate glass, which has the quality of becoming luminescent under ultraviolet light as a result of exposure to high energy radiation, the degree of luminescence or fluorescence being proportional to the dosage of exposure. The sensitivity characteristic of a specimen of this type of glass is depicted in Fig. 1 in which the solid line A is a graph showing sensitivity of the glass to radiation of different effective energies. From this it will be realized how much greater is the response to irradiation in the region of the so called soft X-rays, than in the region of the higher energies such as gamma rays. A suitable base glass is one consisting of $Al(PO_3)_3$, 50 percent; $Ba(PO_3)_2$, 25 percent; $KPO_3$, 25 percent. Into this base glass is incorporated up to 16 percent $AgPO_3$.

It has been known that the constancy of the response may be improved by shielding the detector element with a thin lead sheet but with the disadvantage of cutting off too large a portion of the softer rays bringing the left hand end of the curve down to the form indicated in dotted line at B in Fig. 1. Now it has been found that this disadvantage may be substantially overcome by leaving relatively small portions of the detector element substantially unshielded as by leaving a hole or opening in the lead sheet. Here the hole may be considered as a shielding area of light transmission leaving the phosphate glass shielded only by the air and such portion of a suitable casing of material of high transmission as may intervene between the detector element and the source of high energy radiation.

Thus by providing a lead shield of a thickness of about .040 to .050 of an inch with a small hole therein the hole permitting a small portion of the still softer rays to reach the detector element, the characteristic curve may be further improved to assume the form indicated by the dash line C in Fig. 1. It is to be noted that to use a thinner lead sheet to pass more of the softer rays will not suffice to flatten the curve but will simply lower the peak, cutting off more and more of the left hand end of the curve with increasing thickness as indicated by the portions D, E and F. Instead of the two independent kinds of shielding as furnished by the lead sheet with one or more holes, three or more kinds of shielding may be used to further flatten the curve. For example lead, aluminum and an opening or openings in the metal shielding. Such a further flattened extension of the curve of Fig. 1 to the left should appear as indicated by the dot-and-dash line G. Inasmuch as the openings or holes provide a negligible amount of shielding, such as provided by the atmosphere, of high transmission material intervening between the dosimeter and the radiation source and which negligible shielding also surrounds the wearer of the dosimeter, such shielding may be considered zero shielding for purposes of dosage measurement. Thus the double shielding mentioned above may be considered as consisting of part lead shielding and part zero shielding and the triple shielding as part lead, part aluminum and part zero shielding. In any case the different kinds of shielding are arranged side by side as distinguished from an overlapping relation so that the different kinds will act independently of each other.

Referring to Figs. 2 and 3, which show a preferred form of the invention, the detector element 10, a slab of silver activated phosphate glass is encased in a casing 11 to be carried by personnel likely to be exposed to high energy radiation. The casing 11 is formed of an opaque material having high transmission for high energy radiation of the type to be measured. Such material may be any known or other suitable plastic or synthetic resin, for example cellulose acetate or "bakelite." The casing 11 is constructed in two parts, a base member 12 and cover member 13. The detector element 10, in the present instance a slab of phosphate glass of about three fourths, by three fourths, by three sixteenths of an inch, has secured to its rear face as by a suitable adhesive a thin lead sheet 14 of about .040 to .050 of an inch in thickness, the whole being secured to the rear inner surface of the base 12 by a suitable adhesive. Secured to the inner face of the cover element 13 is a second shield member 15 of sheet lead of a thickness similar to that of the shield 14. Thus when the base and cover members are brought together as shown in Fig. 3 the detector element will be encased within the casing with its two main opposite faces shielded by the shielding elements 14 and 15. Secure assemblage of the casing is effected through engagement of the internally threaded cylindrical side wall 16 of the cover 15 with the externally threaded partial cylindrical side wall 17 of the base 12. To seal the casing, the rim of the side wall of the cover is rabbeted to receive a suitable gasket 18 against which fits a circular flange 19 on the base 14. To complete all round shielding of the detector element the cylindrical side wall 16 of the cover member 13 is provided with a narrow, deep, annular recess 20 carrying an annular side shielding element 21 in the form of a broad band of thin sheet lead of a thickness similar to that of the other shield elements 14 and 15. Thus the detector element is completely surrounded by the shielding material. To provide the desired relatively small areas of substantially zero shielding or high transmission, substantially equally distributed about the detector element, the rear and front shields 14 and 15, and portions of the peripheral shield 21 covering all four sides or edges of the detector element are provided with one or more small holes or openings 22. Where the shields 14, 15 and 21 are of two kinds of shielding material say lead and aluminum with one or more open spaces to provide three degrees of exposure as permitted by the lead, aluminum and the openings, each of the shields is comprised of one or more sheets of lead and aluminum placed side by side with a hole or holes provided in either one or both. Thus the rear shield 14 could be formed as indicated in Fig. 4, the front shield 15 as indicated in Fig. 5, and the circumferential shield 21 as indicated in Fig. 6.

In use the dosimeter may be carried by the user in a pocket of the clothing or otherwise carried on the person or by a suitable suspension cord passed through the eyelet 23. To read the dosimeter to ascertain the accumulated dosage to which the wearer has been subjected the cover element 13 may be removed and the detector element 10 irradiated by ultraviolet light. This causes the detector element to fluoresce with a degree of luminescence proportional to the accumulated dosage. The degree of luminescence may be determined by photoelectric measurement or other photometry, or by comparison with a graduated series of standard luminescent elements. It will be understood that the character and intensity of the ultraviolet exciting radiation, its application and other factors contributing to the reading of the dosage, be maintained substantially constant.

It will further be understood that the utilization of differential shielding in cooperative combination with a detector element differentially responsive to radiation of different energies as taught herein may be applied to any known or other form of differentially responsive detector element. For example the detector element may be any device or substance undergoing a substantially permanent detectable change in proportion to dosage of exposure to high energy radiation.

While one specific embodiment of the invention has been shown and described herein for the purpose of disclosure, it is to be understood that the invention is not limited to such specific embodiment but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. A radiation dosimeter comprising a radiation detector element in the form of a solid slab of silver activated phosphate glass having a relatively high sensitivity to relatively soft rays of 30,000 to 200,000 electron volts effective and relatively lower sensitivity to hard gamma rays of the order of 200,000 to 3,000,000 electron volts, and radiation shielding means shielding a relatively large generally distributed portion of the detector element from soft radiation from all directions, said shielding means having voids of relatively small area distributed around the detector element at least one on each of six opposite sides opposed along three mutually perpendicular lines, whereby the detector will be unshielded from relatively small portions of radiations approaching from any direction to permit the detector to receive hard rays from any direction in relatively large proportion and soft rays from any direction in relatively small proportion.

2. A dosimeter for high energy radiation comprising a detector element in the form of a solid slab of silver activated phosphate glass having a relatively high sensitivity to relatively soft X-rays of the order of 30,000 to 200,000 electron volts effective and a relatively lower sensitivity to radiation of from 200,000 to 3,000,000 electron volts effective, and a shield element completely surrounding the detector element and having different shielding areas of different material lying side by side over and around all sides of the detector slab with at least one shield area of each kind of material on each of six opposite sides of the detector opposed along three mutually perpendicular lines, said different materials absorbing different portions of a range of high energy radiations from about 30,000 to about 200,000 electron volts, at least one of the shield areas on each of said six sides having an opening of relatively small area to permit irradiation of the detector by a small portion of substantially the whole of said range of soft X-rays.

3. A radiation dosimeter comprising a radiation detector element in the form of a solid slab of silver activated phosphate glass having normally a relatively high sensitivity to radiation in the soft X-ray range and relatively lower sensitivity to radiation of the hard or gamma ray range, shielding means covering the slab on all six sides, said shielding means being of a composition and thickness to absorb a large portion of radiation in the soft X-ray range and having a relatively small portion of its area on each of all six sides of the slab replaced by an area of high transmission for radiation in the soft X-ray range, whereby effective response of the detector element as a whole to the soft ray range from all three orthogonal directions is lowered to a level below its response to gamma rays from said directions over large portions of its area and raised toward normal response to soft rays from all directions over relatively smaller portions of its area to bring the sensitivity of the detector element as a whole to soft rays substantially equal to its sensitivity to hard rays.

4. A dosimeter for high energy radiation comprising a radiation detector element in the form of a solid slab of silver activated phosphate glass of a type having a relatively high sensitivity to relatively soft X-rays of the order of 30,000 to 200,000 electron volts effective, and relatively lower sensitivity to radiation of from 200,000 to 3,000,000 electron volts effective, a casing for the detector element covering the slab on all six sides formed of material having high transmission for high energy radiation, and a shielding element having different areas of different shielding quality against high energy radiation interposed between said detector element and a source of high energy radiation said different areas being uniformly distributed over all six sides of the slab.

5. A dosimeter as claimed in claim 4 in which one of the different shielding areas is of a composition and thickness to absorb a relatively large portion of radiation in the soft X-ray range, and another of said different shielding areas is an area of discontinuance of said first area.

6. A radiation dosimeter comprising a radiation detector element in the form of a solid slab of silver activated phosphate glass having normally a relatively high sensitivity to high energy radiation in the soft X-ray range and relatively lower sensitivity to high energy radiation in the hard or gamma ray range, and a shielding element of soft radiation shielding material surrounding the slab on all six sides with voids to permit a relatively small portion of soft radiation to reach the detector element said voids being uniformly distributed over all six sides of the slab.

7. A filter enclosure structure for admitting to a space enclosed thereby predetermined proportions of hard and soft rays from a mixture thereof approaching the enclosed space from any direction comprising a radiation shielding means completely surrounding the enclosed space composed of a material passing hard rays and blocking soft rays, said shielding means having voids of relatively small area distributed around the enclosed space at least one on each of six opposite sides opposed along three mutually perpendicular lines whereby the enclosed space will be shielded from all but relatively small portions of soft rays approaching from any direction.

References Cited in the file of this patent

UNITED STATES PATENTS

| | | |
|---|---|---|
| 2,483,991 | Wollan et al. | Oct. 4, 1949 |
| 2,496,218 | Kieffer | Jan. 31, 1950 |
| 2,513,805 | Kanne | July 4, 1950 |
| 2,524,839 | Schulman et al. | Oct. 10, 1950 |